Dec. 11, 1934.    L. E. HERCHER    1,983,852
VARIABLE SPEED TRANSMISSION MECHANISM
Filed March 22, 1934    4 Sheets-Sheet 1
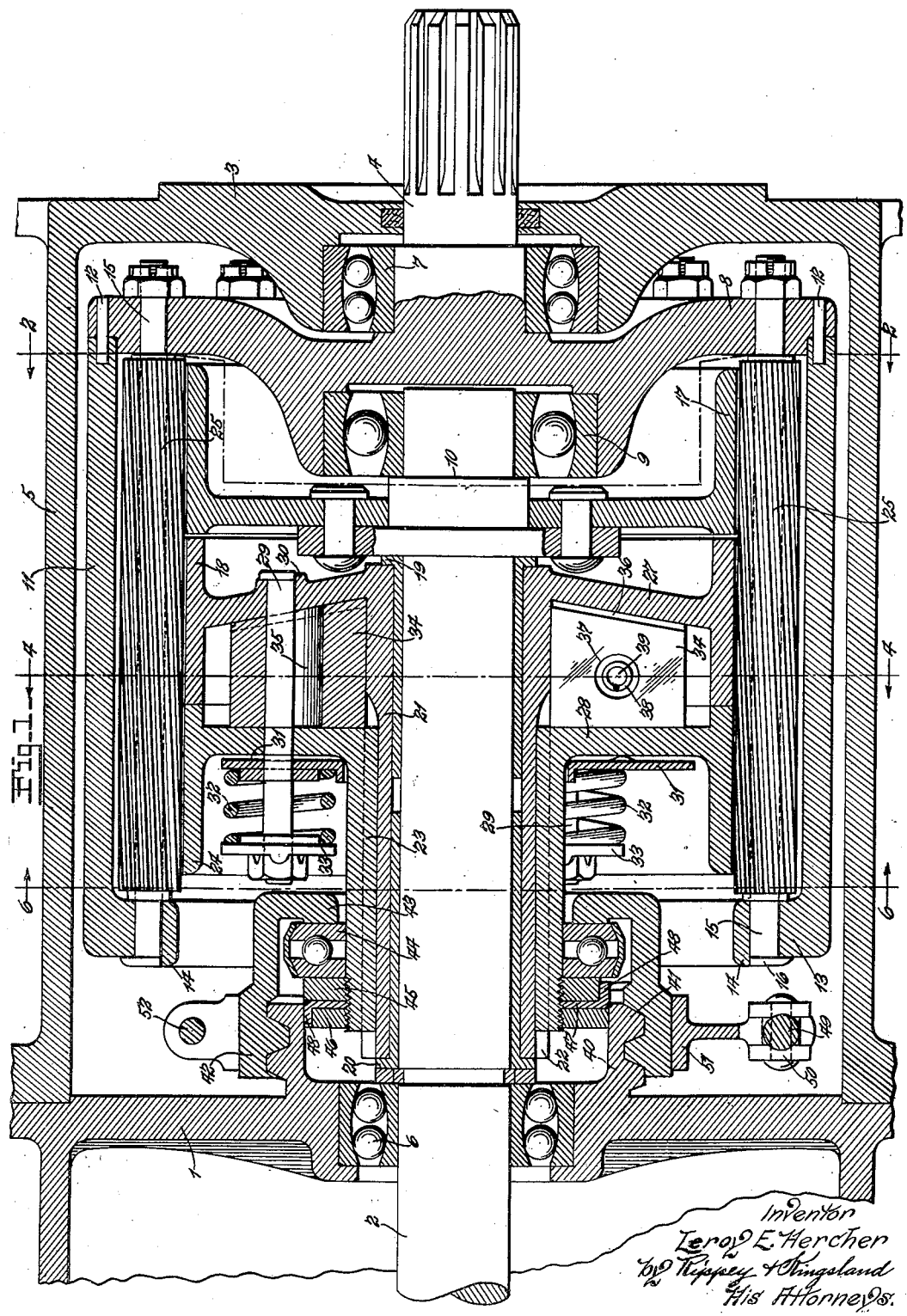

Dec. 11, 1934.   L. E. HERCHER   1,983,852
VARIABLE SPEED TRANSMISSION MECHANISM
Filed March 22, 1934   4 Sheets-Sheet 2
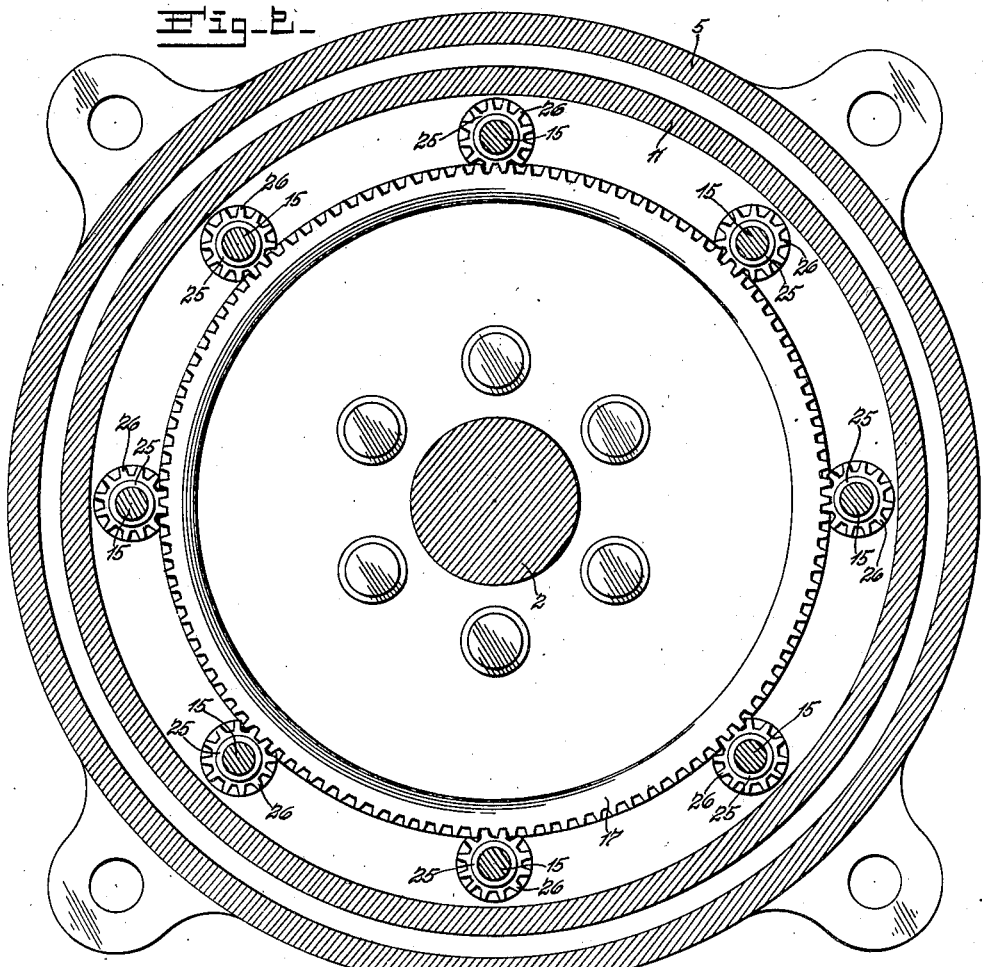
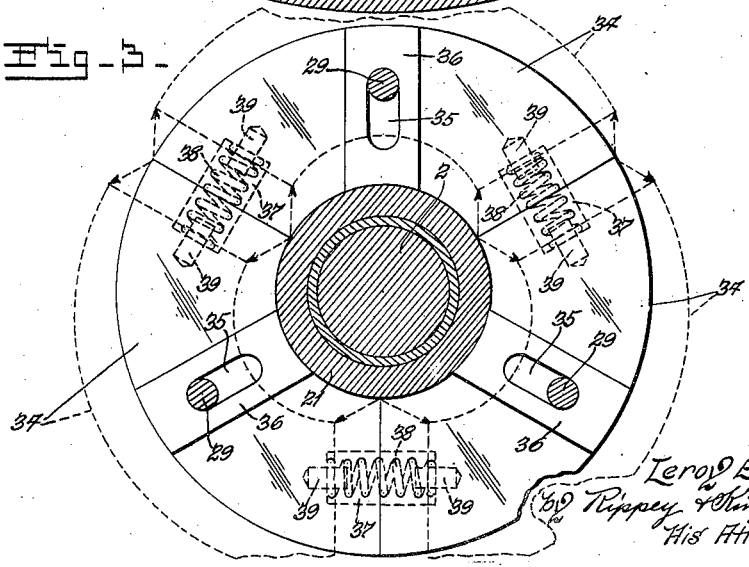
Inventor
Leroy E. Hercher
Rippey & Kingsland
His Attorneys Dec. 11, 1934. L. E. HERCHER 1,983,852
VARIABLE SPEED TRANSMISSION MECHANISM
Filed March 22, 1934 4 Sheets-Sheet 3

Inventor
Leroy E. Hercher
by Rippey & Kingsland
His Attorneys.

Dec. 11, 1934.   L. E. HERCHER   1,983,852
VARIABLE SPEED TRANSMISSION MECHANISM
Filed March 22, 1934   4 Sheets-Sheet 4

Patented Dec. 11, 1934

1,983,852

UNITED STATES PATENT OFFICE 1,983,852

VARIABLE SPEED TRANSMISSION MECHANISM

Leroy E. Hercher, St. Louis, Mo.

Application March 22, 1934, Serial No. 716,763

15 Claims. (Cl. 74—260)

This invention relates to variable speed transmission mechanisms, and is specially designed and adapted for use in connection with practically all types of power driven vehicles and is capable of use in all machines requiring a clutch or transmission device.

Objects of the invention are to provide a simplified and efficient variable speed transmission mechanism applicable to various uses and comprising a driven element supporting a planetary series of gear members having spiral teeth in permanent engagement with gears mounted on a driven shaft and embodying a novel construction for driving said gears and thereby said shaft; to provide a differential construction and formation of the teeth on said gear members and said gears whereby effective operation of said gears is obtained; to provide for moving certain of said gears laterally toward and from cooperating gears in order to obtain effective engagement of said gears with said gear members to rotate said gears and thereby said shaft; and to provide an efficient and simplified construction in the entire mechanism.

Other objects will be readily apparent from the following description, reference being made to the annexed drawings, in which—

Fig. 1 is a longitudinal sectional view of my improved variable speed transmission mechanism.

Fig. 2 is a transverse sectional view on the line 2—2 of Fig. 1.

Fig. 3 is a view illustrating the arrangement of the spacer elements mounted between two of the gears.

Figure 4:
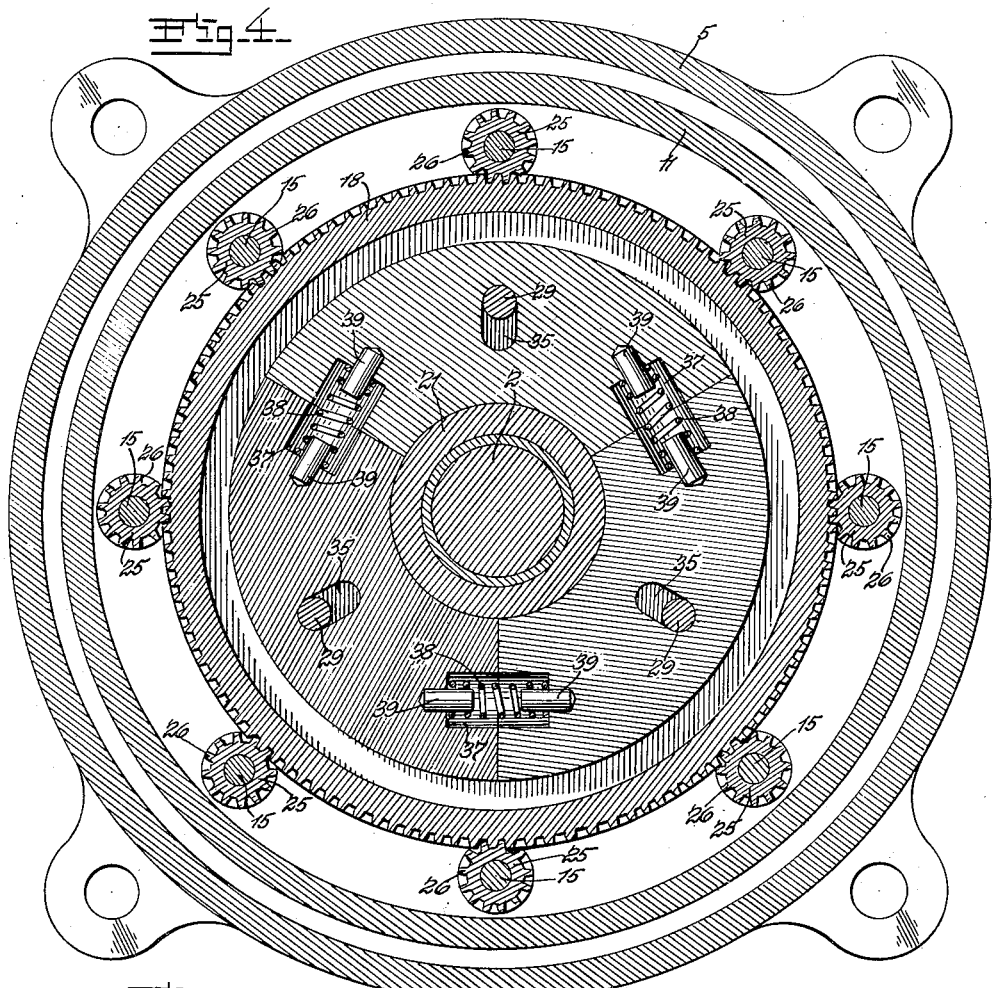
Fig. 4 is a cross sectional view on the line 4—4 of Fig. 1.
Figure 5:
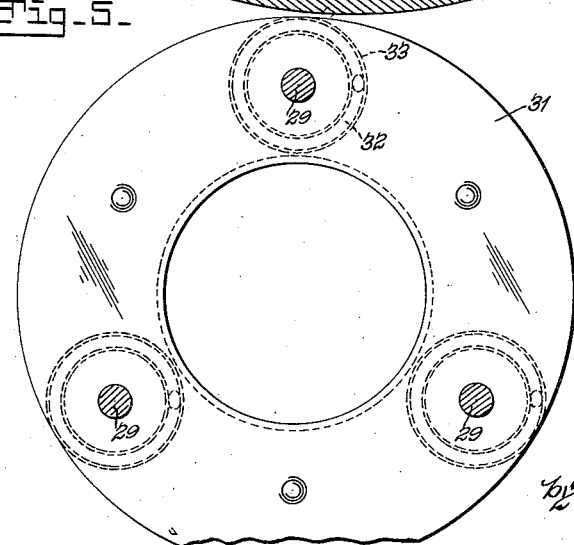
Fig. 5 is a side elevation of a spring abutment ring included in the invention, the bolts or rods around which the springs are mounted being in section.

The mechanism is shown within a housing including an end wall 1, through which the driven shaft 2 extends, an end wall 3 spaced from the end wall 1 through which the driving shaft 4 extends, and an enclosing wall 5 connected with the end walls 1 and 3. The shaft 2 is journalled in an anti-friction gearing 6 supported by the wall 1 and the shaft 4 is journalled in an anti-friction bearing 7 supported by the wall 3. The shafts 2 and 4 are in axial alinement.

A frame member or disc 8 is rigid with the inner end of the shaft 4 and supports an anti-friction bearing 9 in which the end of the shaft 2 is journalled, thereby effectively and positively holding the shafts 2 and 4 in accurate alinement. A circumferential shoulder 10 on the shaft 2 thrusts against a member of the bearing 9 and holds the end of the shaft 2 out of contact with the end of the shaft 4.

A cylindrical frame member 11 has one end rigidly attached to the part 8 by fasteners 12 and has an inwardly extended flange 13 in connection with its opposite end and provided along its inner edge with an outwardly extended rib 14. An annular series of axle members 15 are supported by the part 8 and the flange 13 around and spaced from the shaft 2. The axes of these axle members 15 are parallel with each other and with the axis of the shaft 2. These axle members 15 are held from rotation by heads 16 having flat sides engaging the rib 14 (Fig. 1).

Figure 6:
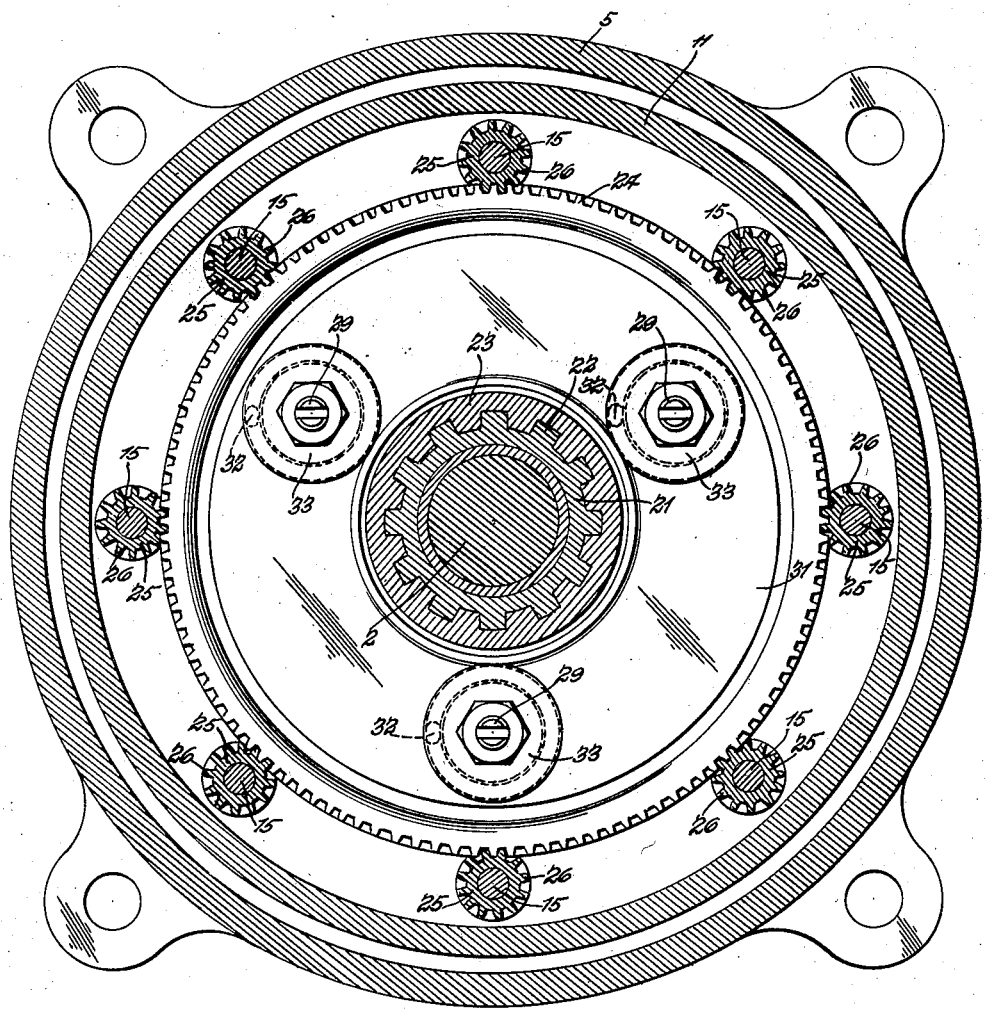
Fig. 6 is a cross sectional view on the line 6—6 of Fig. 1.
Figure 7:
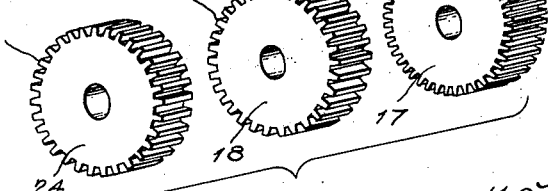
Fig. 7 is an exaggerated view showing the formation of teeth on certain of the gears included in the invention.

A gear 17 is rigidly attached to the shaft 2. A gear 18 is supported for rotation about the shaft 2 and is held from longitudinal movement in either direction by abutments 19 and 20. The gear 18 is rigid with a long hub 21, one end of which engages the abutment 19 and the opposite end of which engages the abutment 20. This hub 21 is formed with a circumferential series of longitudinal ribs or splines 22 (Figs. 1 and 6) on which the hub 23 of a gear 24 is mounted for longitudinal sliding movements toward and from the gear 18. By this construction the gears 18 and 24 must rotate together and the gear 24 is movable toward and from the gear 18.

The gears 17, 18 and 24 are of approximately the same diameter. The gears 18 and 24 have the same number of teeth, but the number of teeth on the gear 17 essentially differs from the teeth on the gears 18 and 24. For example, the gear 17 may be provided with 120 teeth and each of the gears 18 and 24 may be provided with 119 teeth, although these numbers are mentioned only for illustrative purposes and not for purposes of limitation. The teeth on these gears 17, 18 and 24 extend obliquely from one side edge to the opposite side edge of each gear and, in a broad sense, may be designated as spiral teeth.

An elongated gear member 25 is rotatively mounted on each axle 15 and each of said gear members is provided with a spiral series of teeth 26 in permanent mesh with the teeth on the gears 17, 18 and 24. These spiral teeth 26 mesh accurately with the teeth on the gear 17 and the formation and dimensions of those parts of said teeth 26 that engage the gears 18 and 24 differ from the formations and dimensions of those portions of said teeth 26 that engage the gear 17 in order that there may be a proper adaptation of the teeth 26 to each of said gears. Since the gear 17 may comprise 120 teeth and each of the gears 18 and 24 may comprise 119 teeth, it follows that the dimensions of those portions of the teeth 26 that mesh with the gears 18 and 24 are greater than the dimensions of those portions of said teeth 26 that mesh with the gear 17.

The web 27 of the gear 18 inclines laterally toward the gear 24 while the web 28 of said gear 24 is radial. An annular series of rods 29 are mounted in the webs 27 and 28 parallel with each other and with the shaft 2 and are held from turning about their axes by structure 30. A spring abutment ring 31 is mounted on each rod 29 adjacent to the web 28. A spring 32 is mounted around each rod 29. The inner ends of said springs 32 abut against the abutment ring 31 while the outer ends of said springs bear against washers 33 mounted on the rods 29, respectively. These springs 32 act to actuate the gear 24 toward the gear 18 but will yield to permit said gear 24 to be moved in a direction away from the gear 18.

A series of arcuate spacer members 34 are mounted between the webs 27 and 28, having slots 35 through which the rods 29 extend. These spacer members 34 have flat radial sides engaging the flat radial side of the web 28 and have their opposite sides inclined in conformity with the inclination of the web 27 and provided with correspondingly inclined ribs 36 engaging the web 27. In their unoperated position these spacer members 34 are close to the hub 21. When moved outwardly from the hub 21, it is obvious that these spacer members will move the gear 24 laterally away from the gear 18. These spacer members 34 are operated outwardly by centrifugal force when they are rotated with the gears 18 and 24 and the shaft 2. Since the teeth on the gears 17, 18 and 24 are inclined or spiral and are in permanent engagement with the spiral teeth 26 on the gear members 25 and because of the differential arrangement of the teeth on said gear 17 and the gears 18 and 24, respectively, as hereinbefore indicated, it follows as a necessary consequence and effect of the lateral movement of the gear 24 from the gear 18 that the gear 17 is prevented from rotating relative to the gears 18 and 24 and that said gears 18 and 24 will be rotated with and by said gear 17. When the gear 24 is moved laterally away from the gear 18, there is a wedging and locking action of the teeth on said gears 18 and 24 against and with the teeth 26.

The adjacent ends of the spacer members 34 have matching recesses 37 in which springs 38 are mounted, the ends of said springs being on supporting lugs 39 in the ends of said recesses 37. These springs 38 tend to press the spacer members 34 outwardly but they are overcome by the stronger springs 32. However, the springs 38 assist the centrifugal force generated by rotation of the gears 18 and 24 and the shaft 2 to overcome the power of the springs 32 and to move the spacer members 34 outwardly.

The housing end wall 1 supports an inwardly extended annular part 40 formed with a spiral rib or tooth 41. A sleeve 42 is screwed on the spiral rib or tooth 41 and has at its inner end an abutment 43 against a thrust bearing 44 mounted on the long hub 23 of the gear 24. Nuts 45 and 46 are screwed on the ends of the hub 23 and are locked relatively by a washer 47 mounted between said nuts and having laterally bent portions 48 engaging in notches in the peripheries of said nuts (Fig. 1). The nut 45 engages against the opposite side of the thrust bearing 44 from the abutment 43. It is apparent that, when the sleeve 42 is turned and moved toward the end wall 1, the abutment 43, by engaging the thrust bearing 44, will positively move the gear 24 away from the gear 18 and thereby lock the gears 18 and 24 with the gear members 25 and with the gear 17. Consequently when the gear 24 is moved away from the gear 18 in this way, the shaft 2 will be rotated with and by the shaft 4.

An operating rod 49 has one end connected by a pivot device 50 with a split ring 51 mounted on the sleeve 42 and clamped thereto by a familiar clamp device 52. The rod 49 extends to the outside of the housing for connection with any suitable operating device, such as a lever or pedal, to facilitate and expedite the locking of the gears 18 and 24 with the gear 17 in order to drive the shaft 2 by the shaft 4. After the transmission shaft 2 has been started, the resulting centrifugal force applied to the spacer members 34 will maintain a driving connection, whereby the gear 17 will rotate the gears 18 and 24 and thereby the shaft 2. This driving connection will not be invariable. On the contrary, the shaft 2 may be rotated at variable speeds in comparison with the speed of rotation of the shaft 4, depending upon the distance to which the gear 24 is moved from the gear 18. The locking of these gears 18 and 24 with the gear members 25 increases in proportion to the lateral pressure applied to the gear 24 by the spacer members.

When the vehicle is at a standstill and the parts of the transmission mechanism are in the positions in which they will not rotate the shaft 2 the sleeve 42 is away from the end wall 1; that leaves the springs 32 free to hold the gear 24 against the gear 18; and the spacer members 34 are in their inward positions as shown in Fig. 1. Therefore, when the shaft 4 is rotated, since the gear members 25 are loosely engaged with the gears 18 and 24, the gears 18 and 24 will not rotate the shaft 2.

When the operating rod 49 is operated to screw the member 42 along the annular part 40 toward the end wall 1 the abutment 43, which engages the thrust bearing 44, will cause said thrust bearing to move the nuts 45 and 46 and thereby the hub 23 and the gear 24 axially away from the gear 18 in opposition to the springs 32 and to effect locking engagement of the gear 24 with the gear members 25. Thereupon the shaft 2 will be rotated by the gears 18 and 24 and will be rotated so long as the gear 24 is held in locking engagement with the gear members 25. The centrifugal members 34 which are rotated with the gears 18 and 24 are moved outwardly and hold the gear 24 in locking engagement with the gear members 25 while the shaft 4 is rotating at sufficient speed. When the shaft 4 stops the spacer members 34 will be moved inwardly by the springs 32 acting against the gear 24, when the sleeve 42 is away from the wall 1 and permits said springs 32 to expand effectively.

The foregoing includes a description of the operation of my improved variable speed transmission mechanism, the efficiency and simplicity of which should now be apparent. Clearly the construction and arrangement of the parts may be varied as widely as the scope of equivalent limits will permit without departure from the nature and principle of the invention.

I claim:

1. Variable speed transmission mechanism comprising a driven rotary shaft, a transmission shaft in axial alinement therewith, a planetary series of spiral gear members supported by said first shaft, a spiral gear rigid with said second shaft and meshing with said gear members, a pair of spiral gears rotative about said second shaft and meshing with said gear members, means for preventing relative rotation of said pair of gears, and means for moving one of said pair of gears axially from the other to lock said pair of gears and said first gear and said gear members against relative rotation.

2. Variable speed transmission mechanism comprising a rotary shaft, a transmission shaft in axial alinement with said rotary shaft, a planetary series of spiral gear members supported by said rotary shaft, a spiral gear attached to said second shaft and meshing with said gear members, a spiral gear rotative about said second shaft and meshing with said gear members, an additional spiral gear adjacent to said second spiral gear and meshing with said gear members, means for holding said additional spiral gear and said second spiral gear from rotating relatively and leaving said additional spiral gear free to move toward and from said second spiral gear, and centrifugal means between said second and additional spiral gears for spreading them apart and into locking engagement with said gear members.

3. Variable speed transmission mechanism comprising a rotary shaft, a transmission shaft in axial alinement with said rotary shaft, a planetary series of spiral gear members supported by said rotary shaft, a spiral gear attached to said second shaft and meshing with said gear members, a spiral gear rotative about said second shaft and meshing with said gear members, an additional spiral gear adjacent to said second spiral gear and meshing with said gear members, means for holding said additional spiral gear and said second spiral gear from rotating relatively and leaving said additional spiral gear free to move toward and from said second spiral gear, and manual means for moving said additional spiral gear from said second spiral gear and into locking engagement with said gear members.

4. Variable speed transmission mechanism comprising a driven rotary shaft, a transmission shaft in axial alinement with said driven rotary shaft, a planetary series of spiral gear members supported by said driven rotary shaft, a series of relatively movable spiral gears mounted on said second shaft and meshing with said gear members, and means for moving one of said series of gears longitudinally with respect to said gear members and longitudinally of the axes thereof from said other gears to effect locking engagement of said gear members with all of said gears.

5. Variable speed transmission mechanism comprising a driven rotary shaft, a transmission shaft in axial alinement with said driven rotary shaft, a planetary series of spiral gear members supported by said driven rotary shaft, a series of relatively movable spiral gears mounted on said second shaft and meshing with said gear members, and centrifugal devices for moving one of said series of gears longitudinally with respect to said gear members to effect locking engagement of said gear members with all of said gears.

6. Variable speed transmission mechanism comprising a driven rotary shaft, a transmission shaft in axial alinement with said driven rotary shaft, a planetary series of spiral gear members supported by said driven rotary shaft, a series of relatively movable spiral gears mounted on said second shaft and meshing with said gear members, centrifugal devices for moving one of said series of gears longitudinally with respect to said gear members to effect locking engagement of said gear members with all of said gears, and means supported by said gears tending to move said one gear to position to release said locking engagement of said gear members with said gears.

7. Variable speed transmission mechanism comprising a driven rotary shaft, a transmission shaft in axial alinement with said driven rotary shaft, a planetary series of spiral gear members supported by said driven rotary shaft, a series of relatively movable spiral gears mounted on said second shaft and meshing with said gear members, centrifugal devices for moving one of said series of gears longitudinally with respect to said gear members to effect locking engagement of said gear members with all of said gears, and manual means for maintaining said locking engagement.

8. Variable speed transmission mechanism comprising a rotary driven shaft, a planetary series of spiral gear members supported by said shaft and having the teeth thereof of increasing thickness from one end portion, a transmission shaft in axial alinement with said first shaft, a series of spiral gears having different numbers of teeth meshing with said gear members, and means for moving one of said gears longitudinally with respect to said gear members to effect locking engagement of said gear members with all of said gears.

9. Variable speed transmission mechanism comprising a rotary driven shaft, a planetary series of spiral gear members supported by said shaft and having the teeth thereof of increasing thickness from one end portion, a transmission shaft in axial alinement with said first shaft, a series of spiral gears having different numbers of teeth meshing with said gear members, and centrifugal means for moving one of said gears longitudinally with respect to said gear members to effect locking engagement of said gear members with all of said gears.

10. Variable speed transmission mechanism comprising a rotary driven shaft, a planetary series of spiral gear members supported by said shaft and having the teeth thereof of increasing thickness from one end portion, a transmission shaft in axial alinement with said first shaft, a series of spiral gears having different numbers of teeth meshing with said gear members, centrifugal means for moving one of said gears longitudinally with respect to said gear members to effect locking engagement of said gear members with all of said gears, and means supported by said gears tending to release said locking engagement.

11. Variable speed transmission mechanism comprising a rotary driven shaft, a planetary series of spiral gear members supported by said shaft and having the teeth thereof of increasing thickness from one end portion, a transmission shaft in axial alinement with said first shaft, a series of spiral gears having different numbers of teeth meshing with said gear members, centrifugal means for moving one of said gears longitudinally with respect to said gear members to effect locking engagement of said gear members with all of said gears, and a device for positively maintaining said locking engagement irrespective of said centrifugal means.

12. Variable speed transmission mechanism comprising a rotary driven shaft, a planetary series of spiral gear members supported by said shaft, a transmission shaft mounted in axial alinement with said first shaft, a gear attached to said transmission shaft and meshing with said gear members, a pair of gears rotatively supported by said transmission shaft and having a different number of teeth from the number of teeth on said first gear meshing with said gear members, and means for moving one of said pair of gears longitudinally with respect to said gear members to effect and release locking engagement of said gear members with all of said gears.

13. Variable speed transmission mechanism comprising a rotary driven shaft, a planetary series of spiral gear members supported by said shaft, a transmission shaft mounted in axial alinement with said first shaft, a gear attached to said transmission shaft and meshing with said gear members, a pair of gears rotatively supported by said transmission shaft and having a different number of teeth from the number of teeth on said first gear meshing with said gear members, and centrifugal means for moving one of said pair of gears longitudinally with respect to said gear members to effect locking engagement of said gear members with all of said gears.

14. Variable speed transmission mechanism comprising a rotary driven shaft, a planetary series of spiral gear members supported by said shaft, a transmission shaft mounted in axial alinement with said first shaft, a gear attached to said transmission shaft and meshing with said gear members, a pair of gears rotatively supported by said transmission shaft and having a different number of teeth from the number of teeth on said first gear meshing with said gear members, centrifugal means for moving one of said pair of gears longitudinally with respect to said gear members to effect locking engagement of said gear members with all of said gears, and manual means for positively maintaining said locking engagement.

15. Variable speed transmission mechanism comprising a rotary driven shaft, a planetary series of spiral gear members supported by said shaft, a transmission shaft mounted in axial alinement with said first shaft, a gear attached to said transmission shaft and meshing with said gear members, a pair of gears rotatively supported by said transmission shaft and having a different number of teeth from the number of teeth on said first gear meshing with said gear members, centrifugal means for moving one of said pair of gears longitudinally with respect to said gear members to effect locking engagement of said gear members with all of said gears, manual means for positively maintaining said locking engagement, and devices tending to move said one gear to position to release said locking engagement.

LEROY E. HERCHER.